US012604862B2

(12) United States Patent
Van Logtenstein

(10) Patent No.: US 12,604,862 B2
(45) Date of Patent: Apr. 21, 2026

(54) MILKING STALL WITH INDEXING LIFT RAIL

(71) Applicant: Dairy Lane Systems Ltd., Komoka (CA)

(72) Inventor: Michael William Van Logtenstein, Ilderton (CA)

(73) Assignee: Dairy Lane Systems Ltd., Komoka (CA)

( * ) Notice: Subject to any disclaimer, the term of this patent is extended or adjusted under 35 U.S.C. 154(b) by 363 days.

(21) Appl. No.: 18/343,083

(22) Filed: Jun. 28, 2023

(65) Prior Publication Data

US 2024/0000038 A1 Jan. 4, 2024

Related U.S. Application Data

(60) Provisional application No. 63/356,593, filed on Jun. 29, 2022.

(51) Int. Cl.
*A01K 1/12* (2006.01)
*A01K 1/00* (2006.01)

(52) U.S. Cl.
CPC .............. *A01K 1/12* (2013.01); *A01K 1/0017* (2013.01)

(58) Field of Classification Search
CPC ................................ A01K 1/12; A01K 1/0017
See application file for complete search history.

(56) References Cited

U.S. PATENT DOCUMENTS

| | | | | |
|---|---|---|---|---|
| 5,259,335 | A | * 11/1993 | Moreau | ..................... A01K 1/12 119/14.03 |
| 5,285,746 | A | * 2/1994 | Moreau | ..................... A01K 1/12 119/752 |
| 5,615,637 | A | * 4/1997 | Nelson | ................. A01K 1/0017 119/14.03 |
| 5,638,768 | A | * 6/1997 | Moreau | ..................... A01K 1/12 119/739 |
| 5,970,920 | A | 10/1999 | Peacock | |
| 6,216,633 | B1 | * 4/2001 | Gallagher | ................ A01K 1/12 119/757 |
| 7,007,632 | B1 | 3/2006 | Vrieze et al. | |
| 8,291,859 | B2 | 10/2012 | Leyrit | |

(Continued)

FOREIGN PATENT DOCUMENTS

| | | |
|---|---|---|
| EP | 784927 B1 | 3/1999 |
| NZ | 589338 A | 3/2012 |
| WO | 2019025638 A1 | 2/2019 |

*Primary Examiner* — Katelyn T Truong
(74) *Attorney, Agent, or Firm* — Brunet & Co. Ltd.; Robert Brunet; Hans Koenig

(57) ABSTRACT

A milking stall has a lift rail; an actuator for rotating the lift rail between neutral and maximum positions; a divider mounted on and extending rearward of the lift rail; and, an exit gate mounted on and depending downwardly from the lift rail. The exit gate has a head rail rotatably mounted on the lift rail and a shoulder bar connected to and depending downwardly from the head rail. The exit gate pivots with the lift rail, and the shoulder bar points more rearward in the maximum position than in the neutral position. The head rail is rotatably mounted on the lift rail through a torsion spring. The torsion spring biases rotation of the head rail relative to the lift rail and is pre-loaded on the lift rail to provide a rotational bias to the head rail so that the shoulder bar is urged rearward by the rotational bias.

19 Claims, 11 Drawing Sheets

(56)         References Cited

U.S. PATENT DOCUMENTS

| | | | |
|---|---|---|---|
| 8,579,539 B2 | 11/2013 | Finn et al. | |
| 9,247,687 B2 | 2/2016 | Gray et al. | |
| 10,477,830 B2 | 11/2019 | Earls | |
| 2007/0137578 A1* | 6/2007 | Van Den Berg | A01K 1/12 |
| | | | 119/14.02 |
| 2007/0186859 A1* | 8/2007 | Moreau | A01K 1/12 |
| | | | 119/14.03 |
| 2008/0163819 A1* | 7/2008 | Sensenig | A01K 1/0017 |
| | | | 119/518 |
| 2014/0331934 A1* | 11/2014 | Eriksson | A01K 1/12 |
| | | | 119/14.04 |
| 2020/0163307 A1* | 5/2020 | Cowling | E05F 17/00 |
| 2022/0192156 A1* | 6/2022 | Mollhagen | A01K 1/0017 |

* cited by examiner

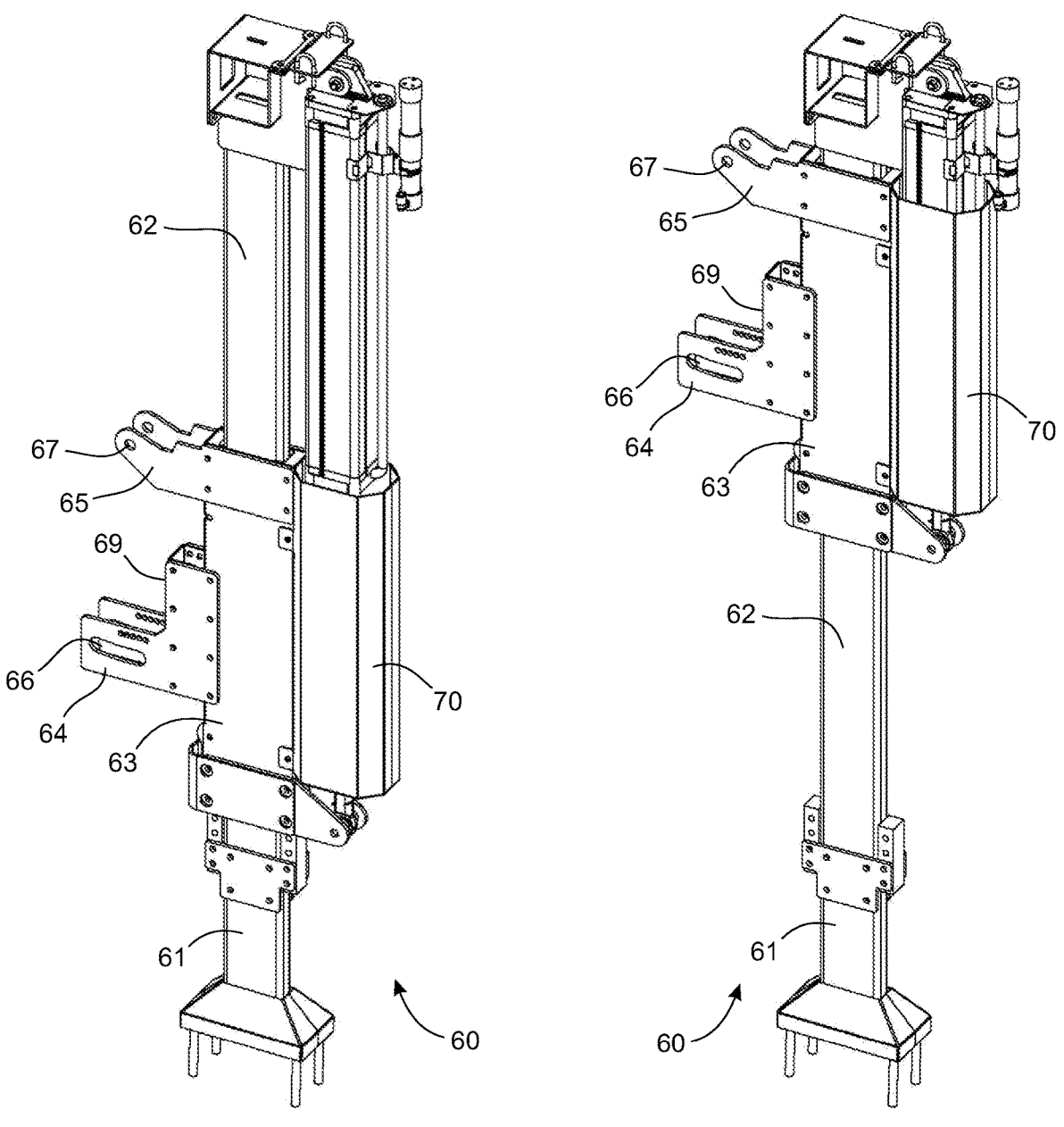
FIG. 7A                  FIG. 7B

MILKING STALL WITH INDEXING LIFT RAIL

CROSS-REFERENCE TO RELATED APPLICATIONS

This application claims the benefit of U.S. Provisional Patent Application Ser. No. 63/356,593 filed Jun. 29, 2022, the entire contents of which is herein incorporated by reference.

FIELD

This application relates to agriculture, in particular to animal husbandry, especially to milking parlors for animals, for example mammals such as cows.

BACKGROUND

Milking parlors having a plurality of milking stalls are usually provided with a pit from which an operator attaches milking members to animals (e.g., cows) in the milking stalls. The animals in the milking stalls are preferably positioned so that the operator can easily reach the udders of the animals and attach the milking members. Because milking stalls are equally large and the animals in a herd have different sizes, there is a risk that small animals of the herd take a position in the milking stalls in which the udders of the animals are located at a relatively long distance from the pit. Therefore, it is desirable to have a mechanism by which animals are encouraged to remain at a rear of the milking stall so that the udders are within easy reach of the operator.

A variety of mechanisms have been proposed in the art, but these mechanisms generally suffer from one or more problems. Some of these mechanisms are insufficiently effective at encouraging the animals toward the rear of the milking stalls. Some mechanisms are overly robust or insufficiently flexible so when applied to a larger animal of the herd, the larger animal is harmed or at least discomfited, which makes the animal unruly and more difficult to handle. Some mechanisms are insufficiently autonomous or self-indexing requiring operator input to properly set the mechanism for each animal. Some mechanisms are overly expensive and/or overly complicated to install and/or operate.

There remains a need for a low-cost, effective, safer mechanism that permits self-indexing of animals to a rear of the milking stalls of a milking parlor without causing damage to or discomfiting the animals.

SUMMARY

A milking stall comprises: a lift rail; an actuator for rotating the lift rail between a neutral position and a maximum position; at least one divider mounted on and extending transversely rearward of the lift rail; and, at least one exit gate mounted on and depending downwardly from the lift rail, the at least one exit gate comprising a head rail rotatably mounted on the lift rail and at least one shoulder bar connected to and depending downwardly from the head rail, the at least one exit gate pivoting with the lift rail between the neutral position and the maximum position, the at least one shoulder bar pointing more rearward in the maximum position than in the neutral position.

A milking parlor comprises the milking stall as defined above and a lift system connected to the lift rail and configured to raise and lower the milking stall.

In some embodiments, the head rail is rotatably mounted on the lift rail through at least one torsion spring mounted on the lift rail. The at least one torsion spring biases rotation of the head rail independent of and relative to the lift rail. In some embodiments, the torsion spring is pre-loaded on the lift rail to provide a rotational bias to the head rail so that the at least one shoulder bar is urged rearward by the rotational bias. In some embodiments, the torsion spring is pre-loaded on the lift rail so that the head rail is rotated at an angle of about 2.0° with respect to vertical when the lift rail is in the neutral position.

In some embodiments, the torsion spring is an elastomer powered torsion spring. In some embodiments, the elastomer powered torsion spring comprises: a tensioner housing; an insert; and a plurality of elastomeric plugs, wherein tensioner housing has the insert inserted therein, the tensioner housing and the insert have a same polygonal cross-section, the insert is rotated with respect to the tensioner housing to provide spaces between internal corners of the tensioner housing and outer faces of the insert, and the elastomeric plugs are friction fitted into the spaces. The polygonal cross-section may be triangular, square, rectangular pentagonal, etc. The polygonal cross-section is preferably square.

In some embodiments, the at least one exit gate further comprises at least one stop bracket connecting the at least one shoulder bar to the head rail. In some embodiments, the at least one stop bracket abuts the lift rail when the at least one exit gate is in a fully forward position thereby preventing the at least one exit gate from further forward rotation. In some embodiments, the at least one shoulder bar has a bottom flared portion for accommodating different animal widths in the at least one exit gate.

In some embodiments, the milking stall further comprises a support column attached to the lift rail. The support column may be configured to be pivotally connected to the lift system for raising and lowering the milking stalls.

Any suitable actuator may be used to rotate the lift rail. Some examples include a hydraulic cylinder, an electric linear actuator, a pneumatic actuator and a mechanical spring. Pneumatic actuators are preferred because provides some resiliency affording a measure of safety for the animals should pneumatic actuators provide some resiliency, which provides some measure of safety should the animal become unruly in the stall. A particularly preferred pneumatic actuator comprises an inflatable/deflatable air cushion. In some embodiments, the actuator is mounted on the support column and situated to abut the lift system when the milking stall is mounted on the lift system.

The various rails and bars may be solid or hollow or may have solid and hollow portions.

In some embodiments, the milking parlor comprises a plurality of the milking stalls. In some embodiments, the plurality of the milking stalls commonly shares the lift rail. In some embodiments, the plurality of milking stalls comprises a plurality of exit gates. In some embodiments, the plurality of milking stalls comprises a plurality of dividers. The milking stalls are preferably situated side-by-side longitudinally along the lift rail, the stalls separated by the dividers. The exits gate defines a front of the stall while the dividers define sides of the stall. A rear guardrail (butt pan) may be employed to close the stall at a rear of the stall to prevent the animal from backing into an operator pit. A single rear guardrail may be used for all of the stalls.

In a milking operation, with the stall in a lowered position, an animal is herded into the stall from the rear and prevented from exiting the stall by the exit gate. The actuator is actuated to rotate the lift rail, and therefore the exit gate, from the neutral position to the maximum position during which the at least one shoulder bar of the exit gate urges the animal to the rear of the stall where an operator can hook a milking machine to udders of the animal. The actuator is then actuated to rotate the lift rail, and therefore the exit gate, from the maximum position to the neutral position. The animal is then milked. At the end of the milking operation, the milking machine is disconnected from the animal's udders, and the lift system is activated to raise the stall thereby freeing the animal to move forward and out of the milking parlor.

During the process of encouraging the animals to the rear of the stall, the lift rail must be rotated sufficiently to encourage the smallest animal to the rear of the stall. The amount of rotation needed to accomplish this is more than for a larger animal, thus the amount of rotation required for the smallest animal risks discomfiting or harming the larger animal as the larger animal could be crushed in the stall by the at least one shoulder bar. To mitigate this problem, the exit gate is mounted on the at least one torsion spring so as the at least one shoulder bar encounters the larger animal, the exit gate can rotate against the bias of the at least one torsion spring to rotate the exit gate forwardly, the torsion spring providing resilience so that that animal is not harmed while encouraging the animal to the rear of the stall.

Further, at any time before the stall is raised out of the way, forward movement of the animal will cause the animal to encounter the at least one shoulder bar. Because the at least one shoulder bar is pre-loaded with a force acting rearward due to the pre-loading of the at least one torsion spring, when the animal encounters the at least one shoulder bar, the animal is encouraged to move rearward instead to relieve the pressure. If the animal is particularly unruly and continues to move forward, the exit gate will rotate on the at least one torsion spring, the torsion spring again providing resilience to prevent harm to the animal while encouraging the animal to the rear of the stall. Should the animal yet continue to move forward against the increasing force imparted by the at least one torsion spring on the exit gate, the at least one stop bracket will eventually abut the lift rail stopping rotation of the exit gate entirely to prevent the animal from exiting the stall.

The torsional spring applying force through the at least one shoulder bar of the exit gate serves to: encourage the animal to move to a rear of the stall when loading the animal in the stall for milking; provides a safety measure for larger animals during the loading process in a multi-stall milking parlor; and, provides a safety measure for the animal should the animal become unruly in the stall at any time during the milking operation.

The milking stall utilizes an inexpensive mechanism for effectively encouraging animals to a rear of the milking stall while at the same time discouraging animals from moving too far forward and providing a comfortable environment in the milking stall for the animal to increase animal safety and reduce the likelihood of the animal becoming unruly during a milking operation.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 7A depicts the lift system of the milking parlor shown in FIG. 6A.

FIG. 7B depicts the lift system of FIG. 14A in a raised position to permit the animals to exit the milking parlor.

DETAILED DESCRIPTION

Figure 1:
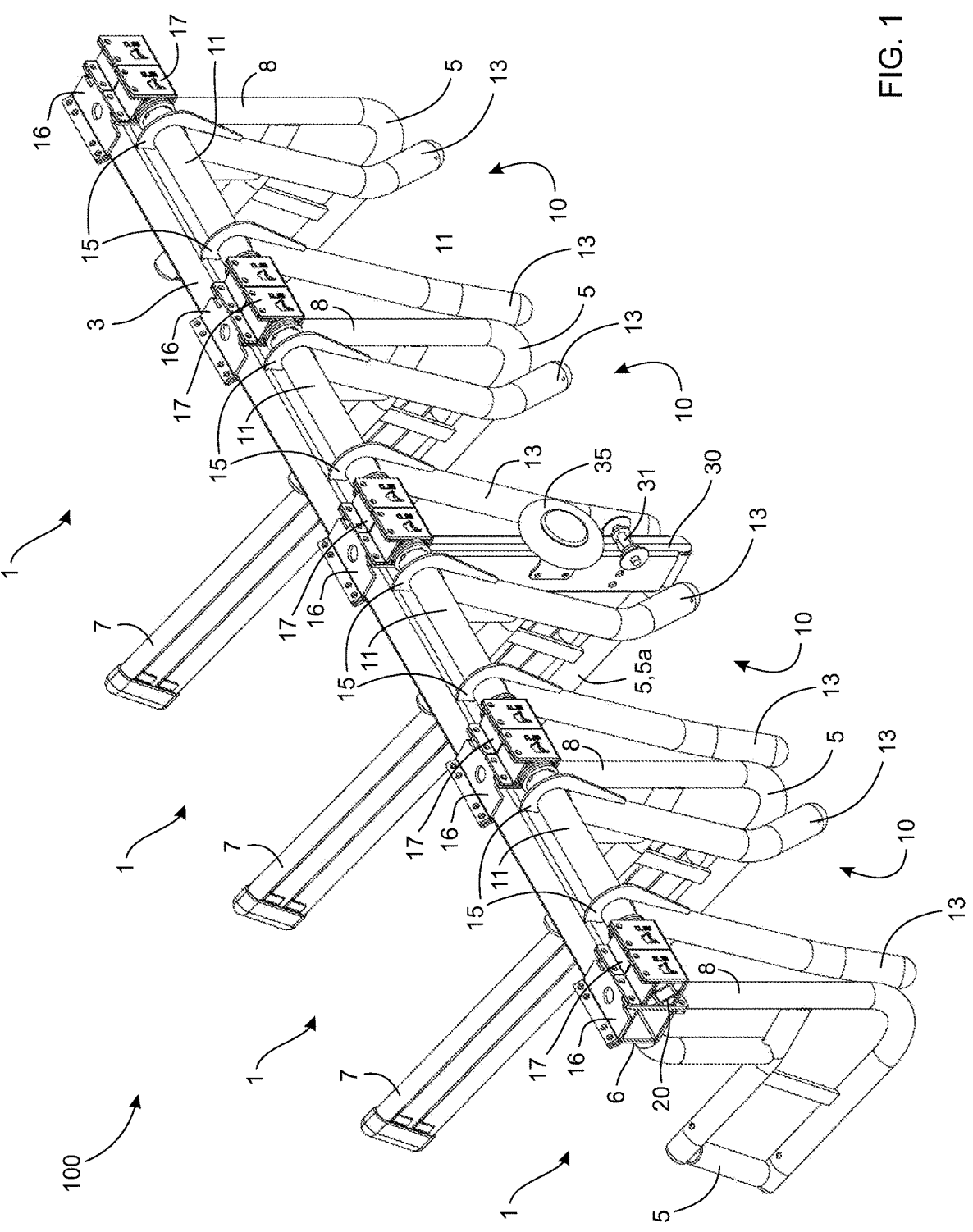
FIG. 1 depicts a front perspective view of a series of four milking stalls for a four-stall milking parlor.
Figure 2:
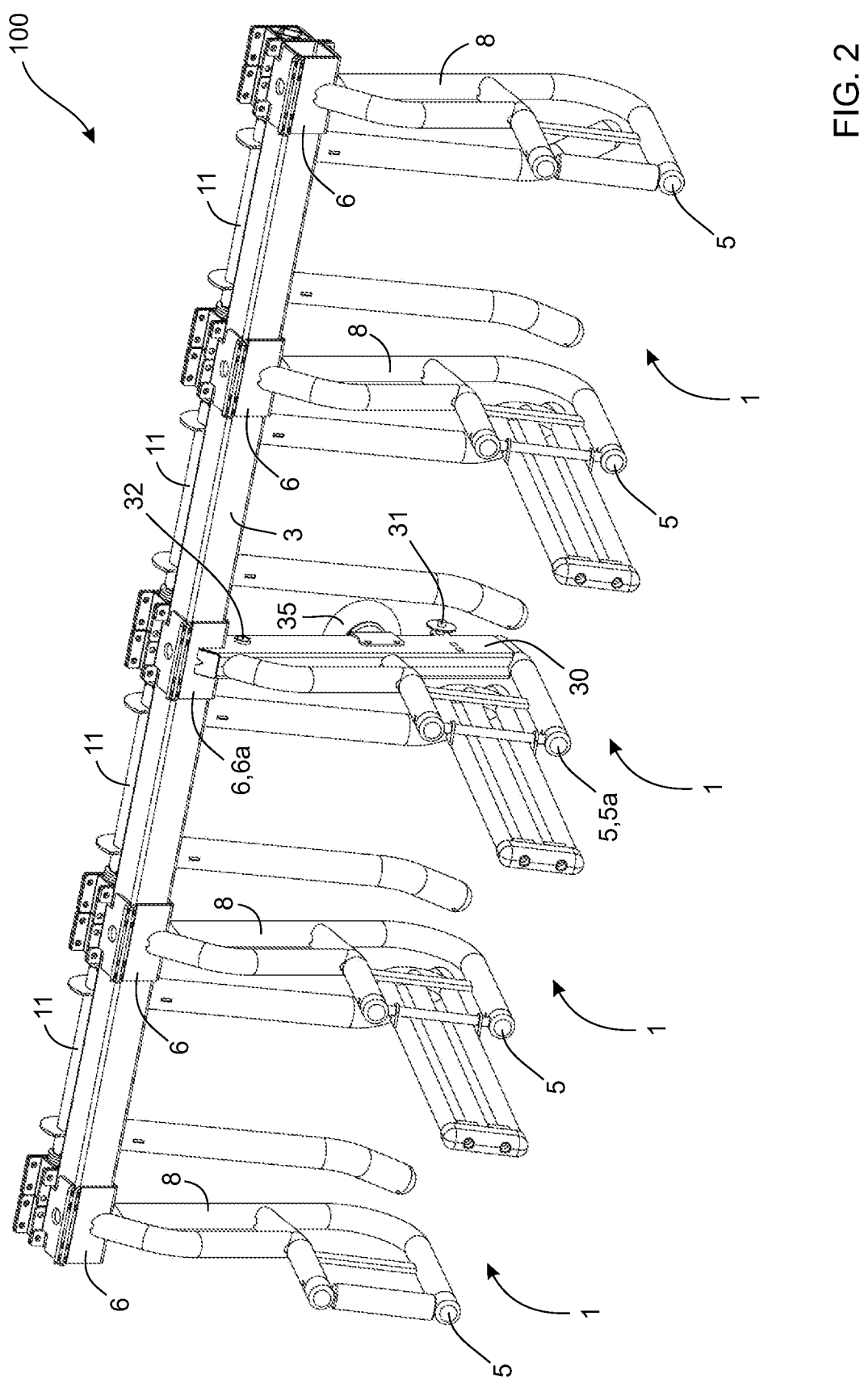
FIG. 2 depicts a rear perspective view of the milking stalls of FIG. 1.
Figure 3:
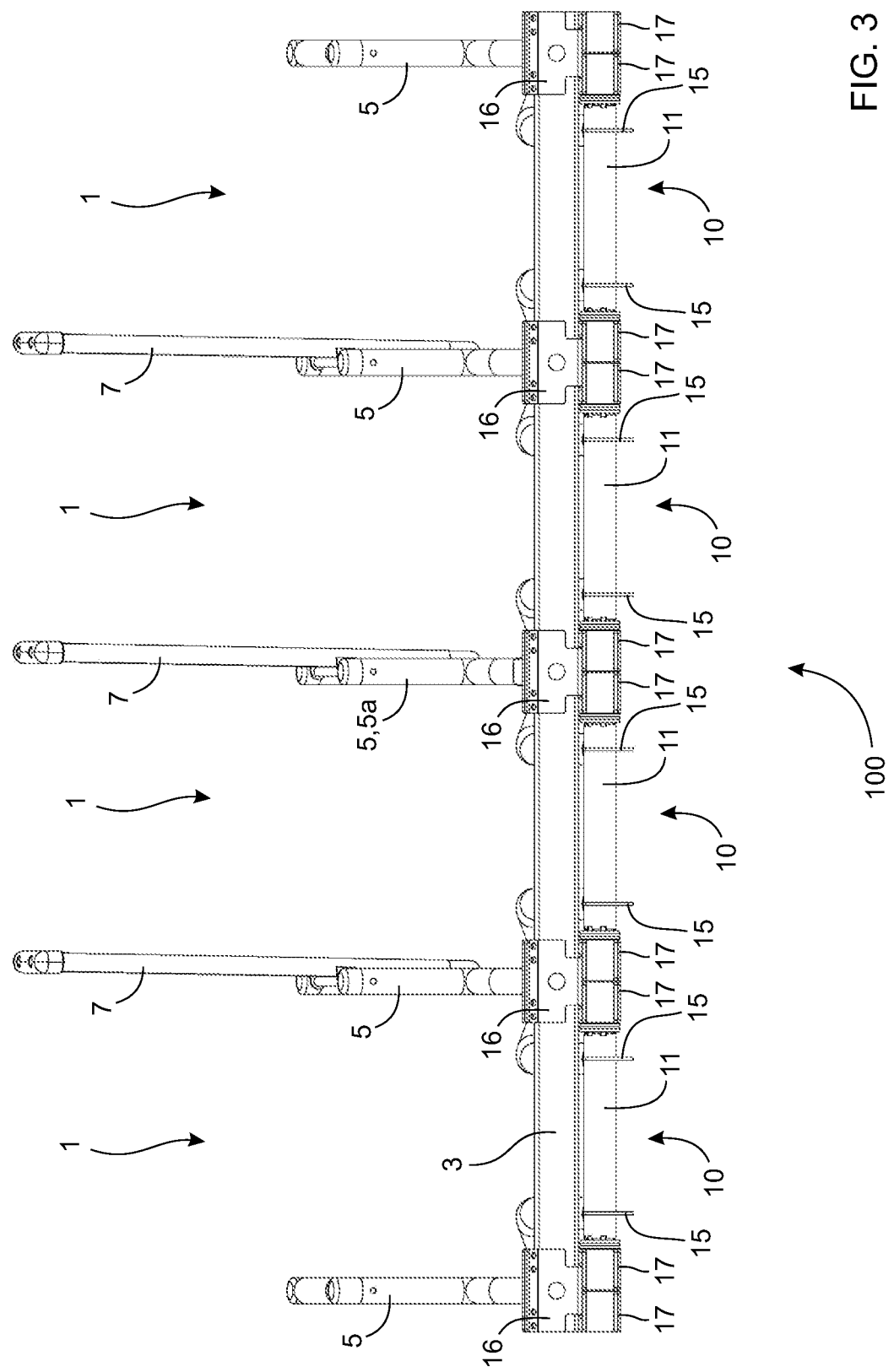
FIG. 3 depicts a top view of the milking stalls of FIG. 1.
Figure 4:
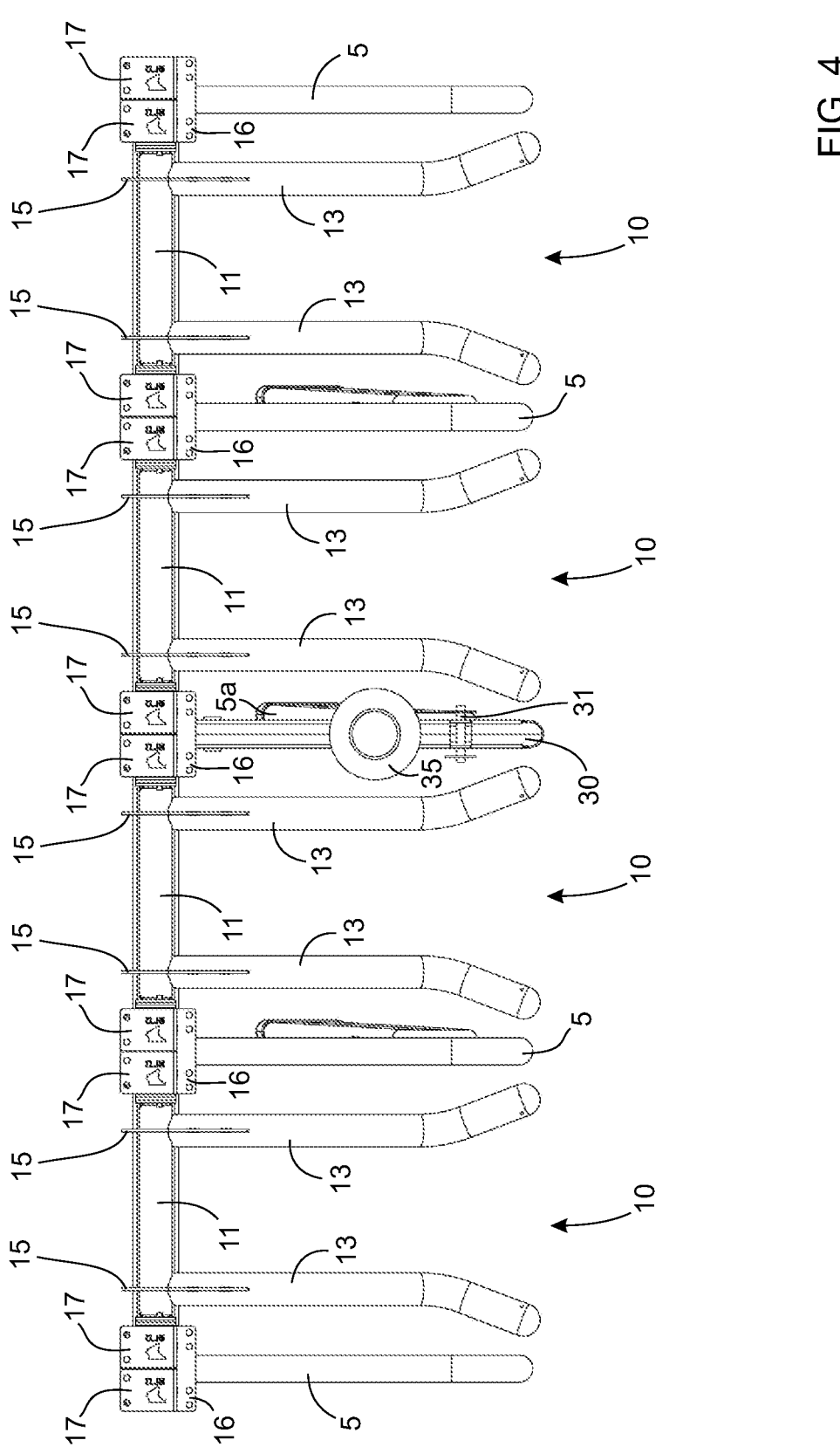
FIG. 4 depicts a front view of the milking stalls of FIG. 1.

FIG. 1 to FIG. 5 depict a series of four milking stalls 1 for a four-stall milking parlor 100. The four milking stalls 1 share a common lift rail 3 so that the stalls 1 can be operated in-tandem for milking four animals simultaneously. While a four-stall milking parlor is illustrated, the milking parlor can have any number of stalls, for example 1, 2, 3, 4, 5, 6, 7, 8 or more stalls. The stalls 1 are separated from each other by dividers 5 that are rigidly attached to and extend rearward and transversely from the lift rail 3. The dividers 5 both separate the animals in the milking parlor 100 from each other and contain each animal in their respective stalls 1. The dividers 5 in the middle comprise extension rails 7 so that the animals in adjacent stalls 1 do not interfere with each other. The dividers 5 are supported on the lift rail 3 through L-shaped mounting brackets 6. The L-shaped mounting brackets 6 are preferably welded to the dividers 5, but any suitable attachment may be used, for example bolts, rivets and the like. The dividers 5 comprise an upwardly extending mounting bar 8 that is rigidly attached to an underside of the L-shaped mounting brackets 6. However, as seen in FIG. 2, a center divider 5a lacks a mounting bar 8, the mounting bar 8 being replaced by a centrally located support column 30 for a lift system 60 of the milking parlor 100.

Exit gates 10 are rotatably mounted on and extend downwardly from the lift rail 3 at a position forward of the lift rail 3. The exit gates 10 comprise head rails 11, which are substantially parallel to and in front of the lift rail 3. The exit gates 10 also comprise pairs of downwardly extending shoulder bars 13 that block the animals' exit from the stalls 1 when the lift rail 3 is in a lowered position. The shoulder bars 13 are rigidly connected to the head rails 11 by stop brackets 15, for example by welding the stop brackets 15 to the head rails 11. The stop brackets 15 are preferably welded to or monolithically molded with the shoulder bars 13. To permit rotation of the head rails 11 independent of the lift rail 3, and therefore the exit gates 10 independent of the lift rail 3, ends of the head rails 11 are mounted to torsion springs 20, which are housed in outer housings 17 attached to head-rail mounting brackets 16. The ends of the head rails 11 are sized and shaped for mounting in the torsion springs 20. The remaining portions of the head rails 11 can be any desired size and cross-sectional shape. Each of the head-rail mounting brackets 16 has an L-shaped portion that is supported on the lift rail 3. The head rails 11 are separated from each other so the exit gates 10 are independent of each other. Thus, each exit gate 10 responds to the action of the animal in that stall 1 but not the actions of the animals in the other stalls 1.

Figure 5:
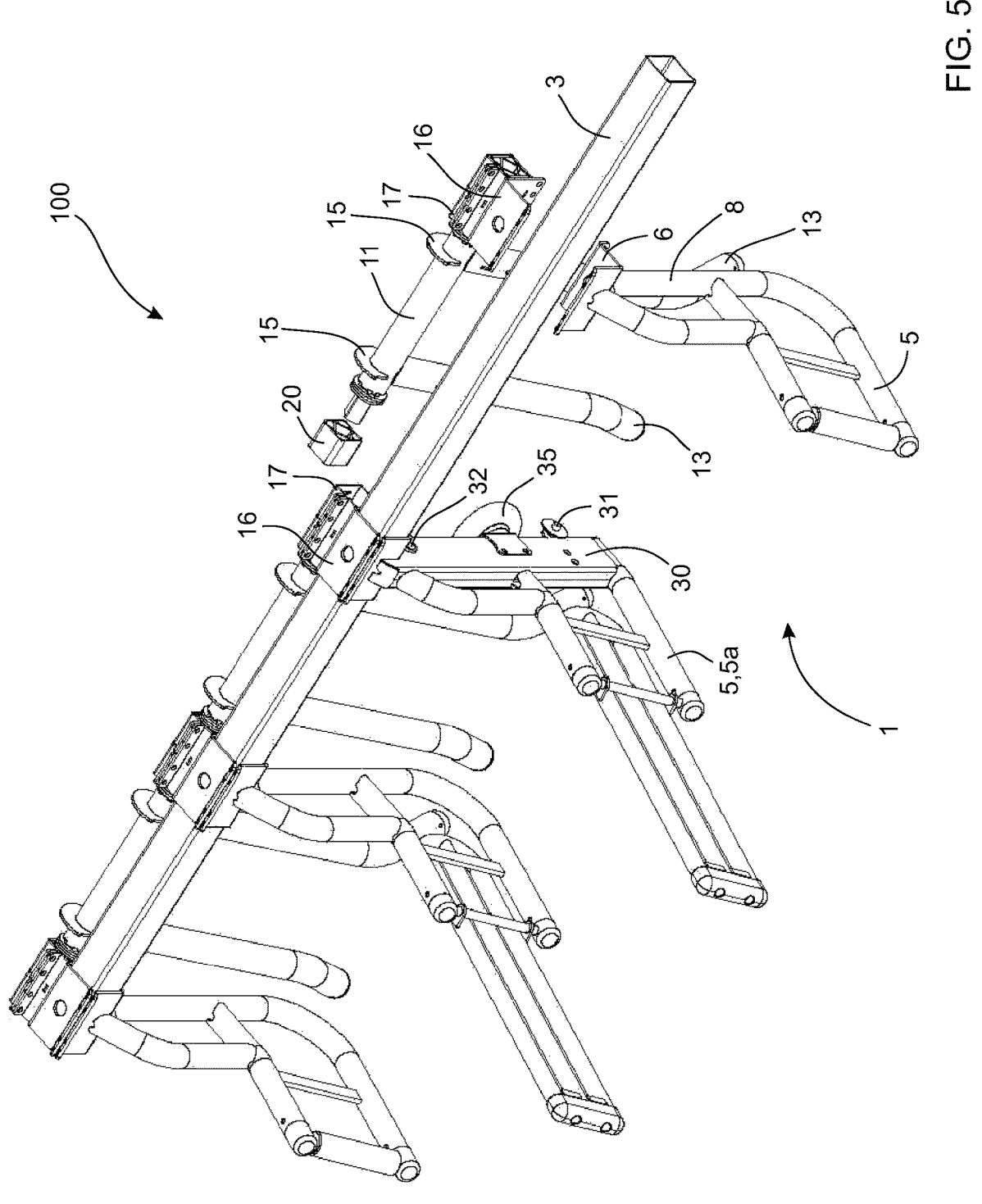
FIG. 5 depicts a rear exploded view of a portion of the milking stalls of FIG. 1.

As best seen in FIG. 5, each of the exit gates 10 is associated with one of the dividers 5 so that one exit gate 10 and the associated divider 5 can be installed together as a unit on the lift rail 3. To mount the exit gates 10 and the dividers 5 on the lift rail 3, the L-shaped portions of the head-rail mounting brackets 16 are bolted to the L-shaped mounting brackets 6 to clamp the lift rail 3 between the brackets 6, 16. One end of each head rail 11, and therefore the torsion spring 20 to which the one end is mounted, is housed in one of the outer housings 17 attached to the head rail mounting bracket 16 of one of the units, while the other end of the head rail 11, and therefore the torsion spring 20 to which the other end is mounted, is housed in one of the outer housings 17 attached to the head rail mounting bracket 16 of an adjacent unit.

The lift rail 3 is supported on at least one support column rigidly attached to and depending downwardly from the lift rail 3. While more than one support column may be used, the illustrated embodiment utilizes the single centrally located support column 30. The support column 30 is attached to a central the L-shaped mounting bracket 6a, which is one of the L-shaped mounting brackets 6. The support column 30 is preferably attached to the central the L-shaped mounting bracket 6a by welding, although any suitable attachment may be used. The support column 30 comprises a lower mounting pin 31 and an upper aperture 32 that permit rotatably mounting the lift rail 3 on the lift system 60 of the milking parlor 100. The support column 30 further comprises an inflatable/deflatable air cushion 35 connected to a front face of the support column 30.

Figure 6B:
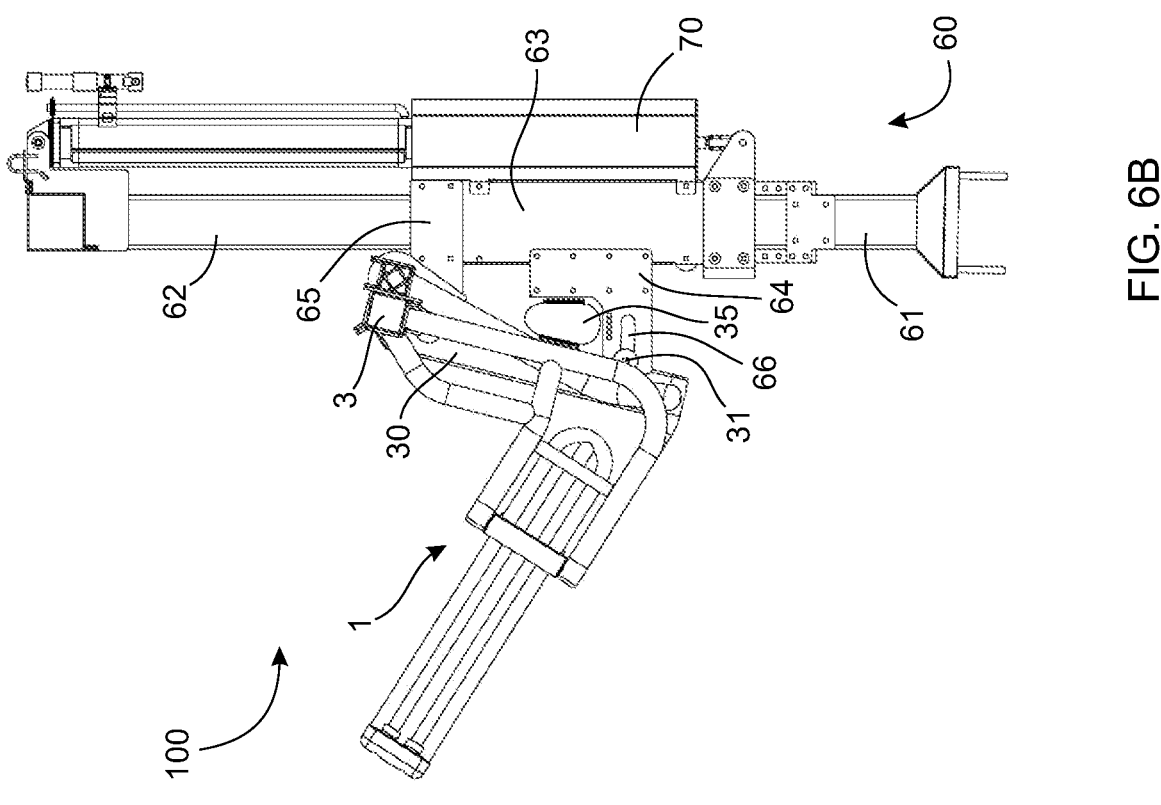
FIG. 6B depicts the milking parlor of FIG. 6A with the lift rail in a maximum position.
Figure 6A:
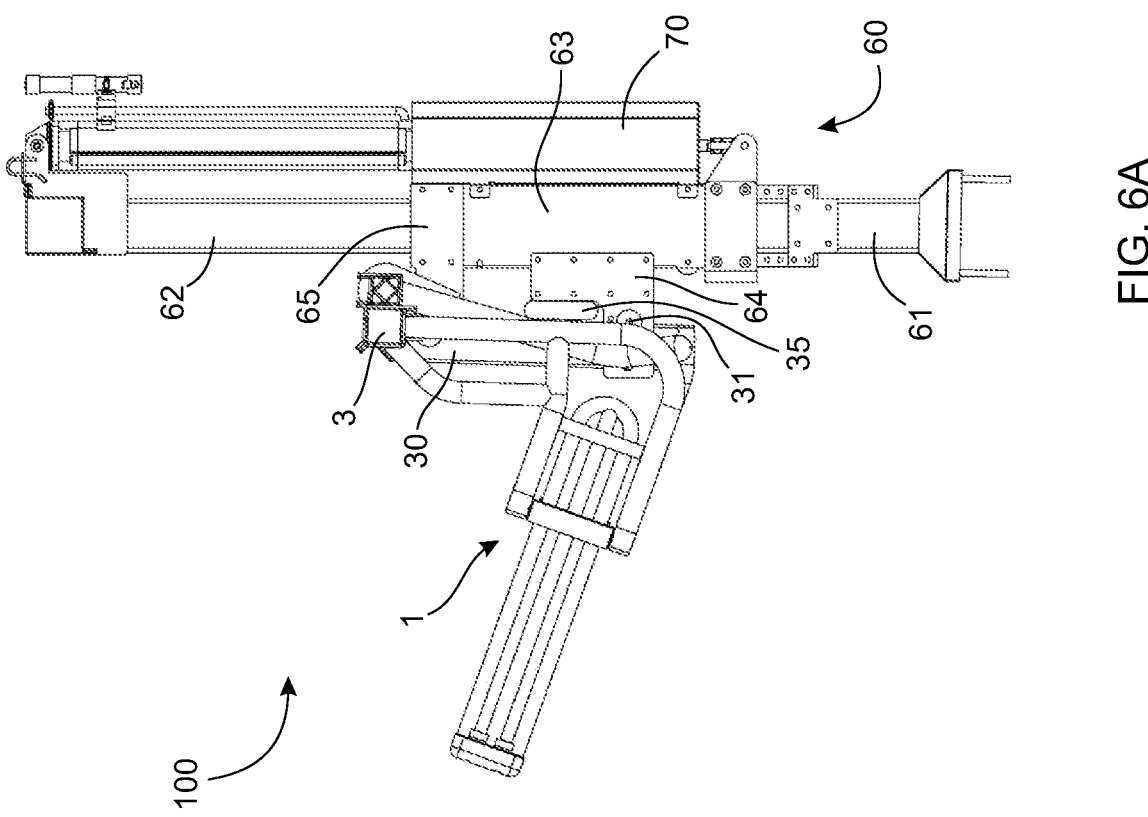
FIG. 6A depicts a side cross-sectional view of a milking parlor with the milking stalls of FIG. 1 mounted on a lift system in a lowered position to contain animals in the milking stalls and with a lift rail of the milking stalls in a neutral position.

FIG. 7A and FIG. 7B depict the lift system 60 of the milking parlor 100, while FIG. 6A and FIG. 6B depict the lift system 60 with the stalls 1 mounted thereon. The lift system 60 comprises an upwardly oriented pedestal 61 supported on the floor of a milking facility. The pedestal 61 comprises a support strut 62 and a slide 63 slidingly mounted on the strut 62. A lower clevis fork 64 and an upper clevis fork 65 are rigidly connected to the slide 63, the clevis forks 64, 65 oriented transversely to the strut 62. The lower clevis fork 64 comprises opposed slots 66 through which the lower mounting pin 31 of the support column 30 is inserted to mount the lift rail 3, and therefore the stalls 1, on the lift system 60. The upper clevis fork 65 comprises opposed apertures 67 that can be aligned with the upper aperture 32 of the support column 30, the aligned apertures 32, 67 accepting a mounting pin therethrough to pivotally mount the lift rail 3, and therefore the stalls 1, on the lift system 60. Pivoting of the lift rail 3 about the mounting pin through the aligned apertures 32, 67 is permitted through a defined angle because the lower mounting pin 31 is able to translate in the slots 66. The arcuate distance through which the lift rail 3 can pivot is limited by the length of the slots 66. In order to pivot the lift rail 3, the air cushion 35 is situated on the support column 30 between the lower mounting pin 31 and the upper aperture 32. When the stalls 1 are mounted on the lift system 60, the air cushion 35 engages an abutment face 69 of the lower clevis fork 64. Inflation and deflation of the air cushion 35, which is sandwiched between the front face of the support column 30 and the abutment face 69 of the lower clevis fork 64, causes the lift rail 3, and therefore the stalls 1, to pivot between a neutral position (FIG. 6A) and a maximum position (FIG. 6B).

The lift system 60 further comprises an actuator 70, for example a hydraulic cylinder or a linear actuator. The actuator is configured to linearly translate the slide 63 on the strut 62. One portion of the actuator 70 is connected to the slide 63 and another portion is connected to the strut 62. Extension and retraction of the actuator 70 causes the slide 63 to translate on the strut 62 thereby lowering and raising the lift rail 3, and therefore the stalls 1, mounted on the slide 63. The slide 63, and therefore the lift rail 3 and the stalls 1, can be lowered and raised between a lowered position (FIG. 7A) and a raised position (FIG. 7B). In the lowered position, the stalls 1 are in position to contain the animals for milking. When the stalls 1 are raised after milking is completed, the animals are free to leave by walking forward.

With reference to FIG. 8A to FIG. 11, in addition to raising and lowering the stalls 1, operation of the milking stalls 1 also comprises two independent pivoting motions, one in which the lift rail 3, and therefore the entire stall 1, is pivoted by inflation/deflation of the air cushion 35, and one in which the head rail 11 is pivoted. The head rail 11 is pivoted by the torsion spring 20 so that the shoulder bars 13 point rearward; and, the head rail 11 pivoted against a rotational bias of the torsion spring 20 by the animal in the stall 1 engaging the shoulder bars 13 so that the shoulder bars 13 are moved more forward.

Figures 8A, 8B, 8C:
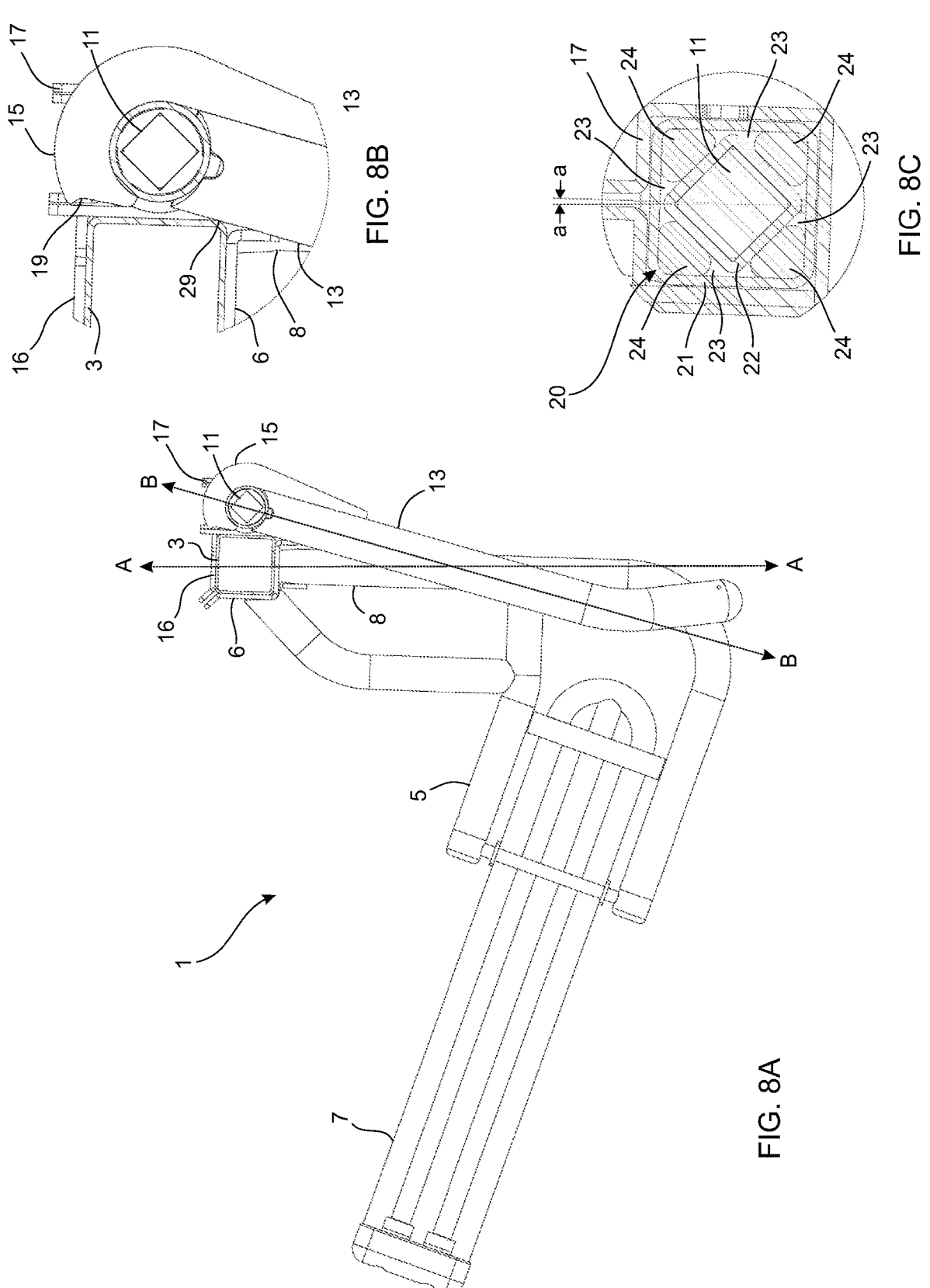
FIG. 8A depicts a side section view of one of the milking stalls shown in FIG. 1 with a lift rail of the milking stalls in a neutral position and an exit gate of the milking stall in a rearward position.
FIG. 8B depicts a magnified view of a torsion spring shown in FIG. 8A.
FIG. 8C depicts a cross-sectional view of the torsion spring shown in FIG. 8B.

In operation, the animals enter the stalls 1 from a rear of the stalls 1 while the stalls 1 are lowered, the lift rail 3 is in a neutral position and the shoulder bars 13 are pivoted rearward. FIG. 8A depicts the stalls 1 when the animals first enter the stalls 1. In the neutral position, the lift rail 3 has an angular position such that longitudinal axes A-A of the mounting bars 8 of the dividers 5 are about 1.9° from vertical. Once the animals are in the stalls 1, the exit gate 10 prevents the animals from exiting the stalls 1. The shoulder bars 13 point slightly rearward, the shoulder bars 13 having longitudinal axes B-B that are about 15.9° from vertical. With animals in the stalls 1, the lift rail 3 can be rotated by inflation of the air cushion 35 up to a maximum position for the lift rail 3 (FIG. 10) such that the longitudinal axes A-A of the mounting bars 8 can be rotated up to about 14.3° from vertical. The shoulder bars 13 point further back into the stalls 1 when the lift rail 3 is rotated in this manner. Rotation of the lift rail 3 can bring the shoulder bars 13 into contact with the animals in the stalls 1, encouraging the animals to move back in the stall 1 as far as possible so that the animals' udders are within easy reach of an operator in the pit. The amount of rotation of the lift rail 3 needed depends on the size of the smallest animal in the stalls 1. While any actuator (e.g., a hydraulic cylinder, an electric linear actuator, a pneumatic actuator, a mechanical spring and the like, may be used to actuate rotation of the lift rail 3, the use of an inflatable air cushion to actuate rotation of the lift rail 3 provides some resiliency affording a measure of safety for the animals should they become unruly in the stalls 1.

Figure 9B:
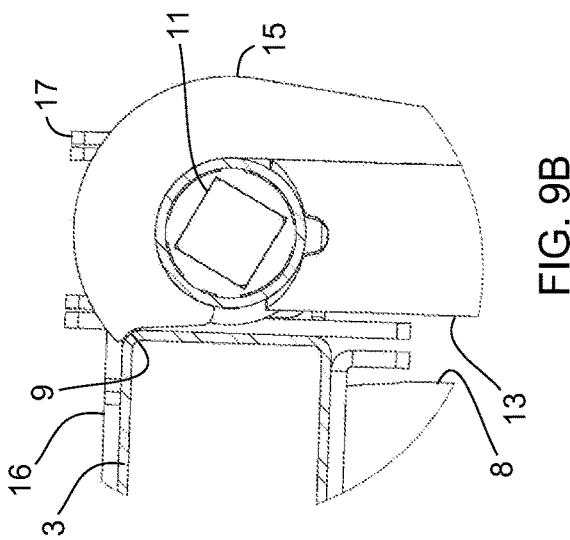
FIG. 9B depicts a magnified view of a torsion spring shown in FIG. 9A.
Figure 9A:
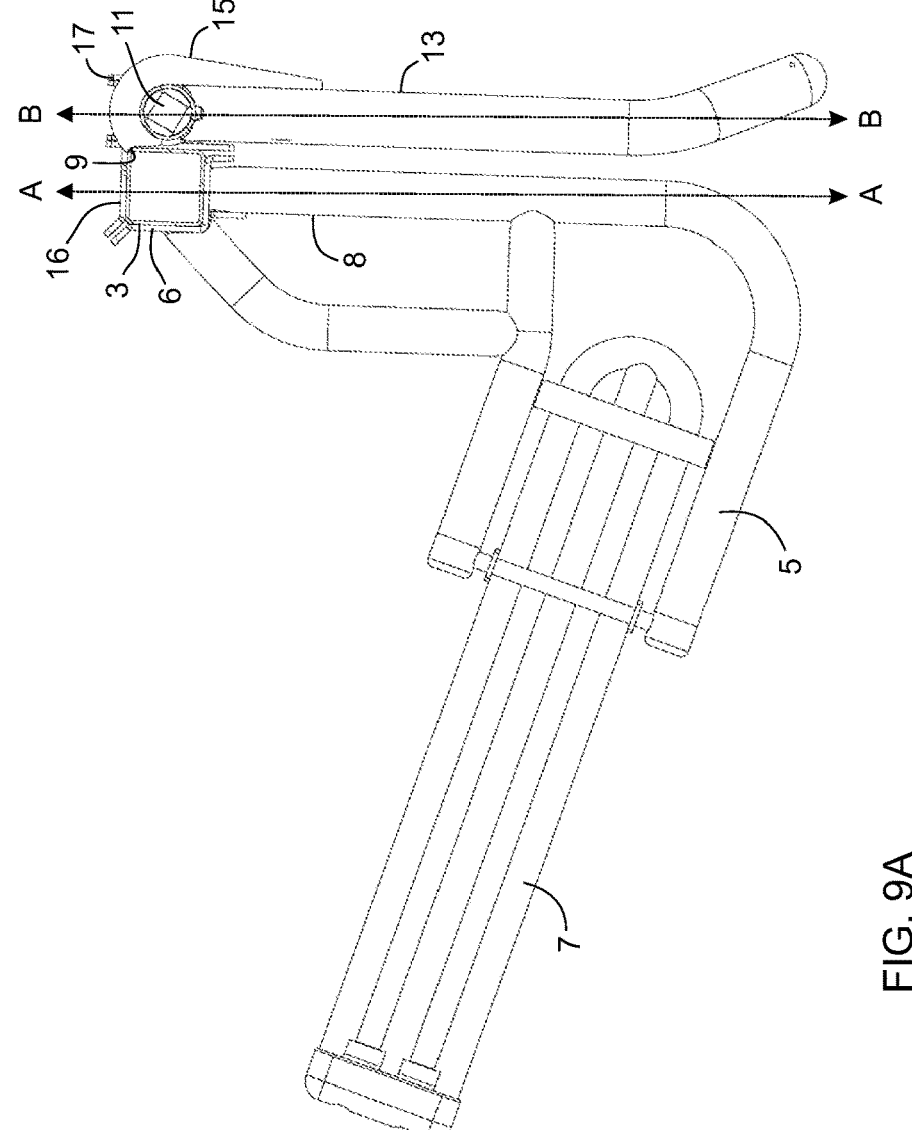
FIG. 9A depicts the side section view of FIG. 8A with the exit gate in a forward position.
Figure 10:
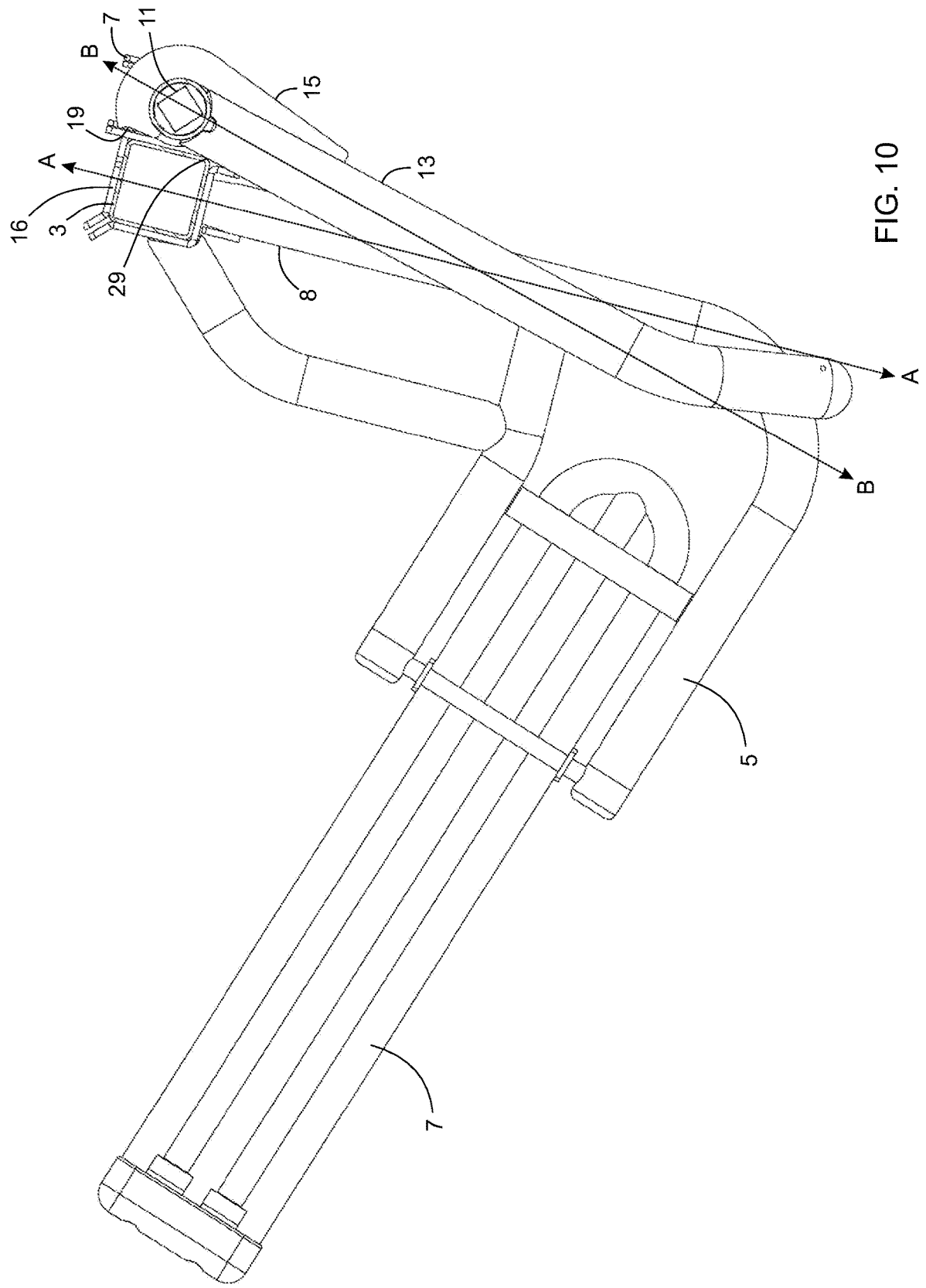
FIG. 10 depicts the side section view of FIG. 8A with the lift rail in a maximum position.
Figure 11:
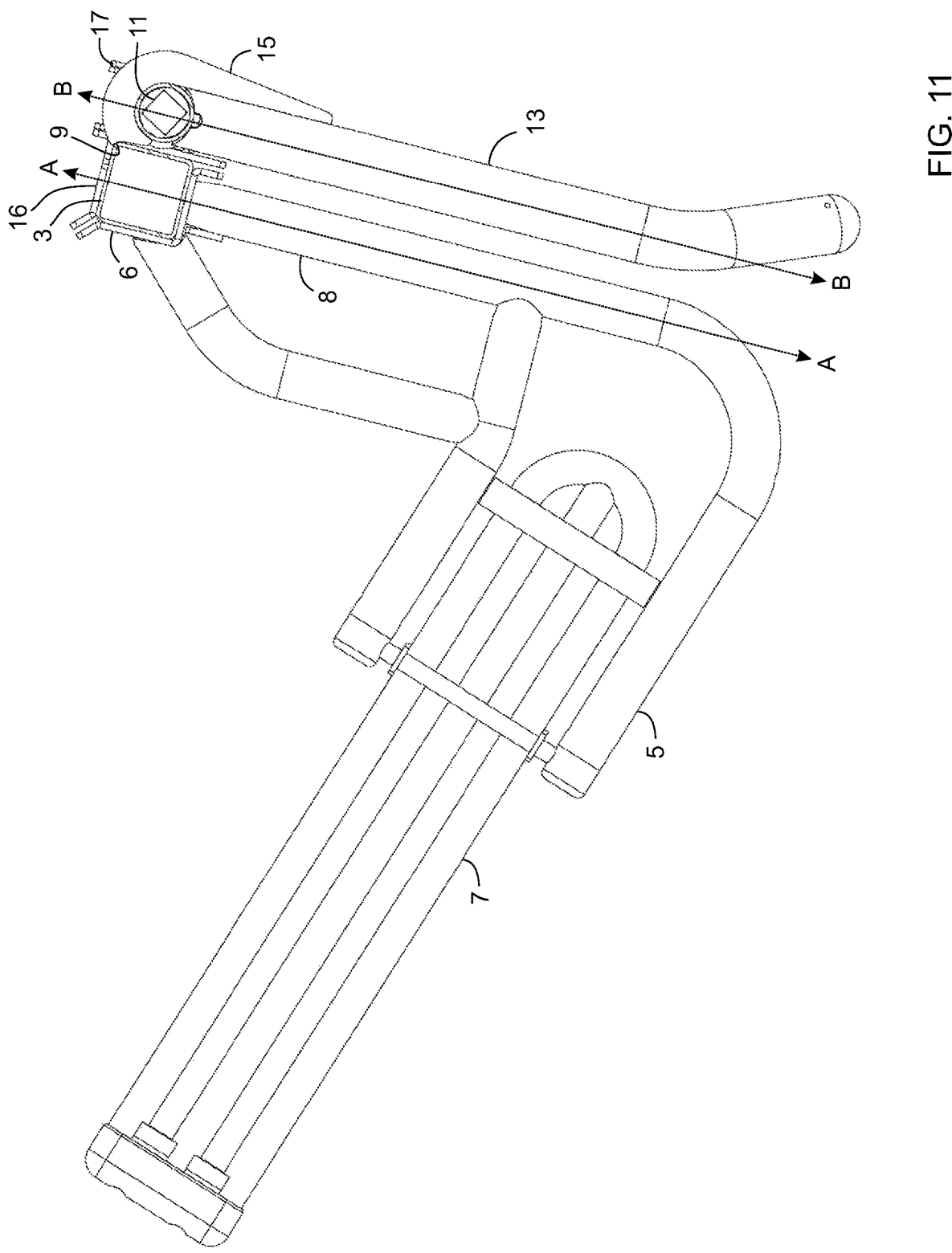
FIG. 11 depicts the side section view of FIG. 9A with the lift rail in a maximum position.

Rotation of the lift rail 3 could potentially cause the animals, especially larger animals, to be crushed in the stalls 1 as the exit gates 10 move rearward. However, the head rails 11 of the exit gates 10 are mounted to the torsion springs 20. The torsion springs 20 permit some rotation of the head rail 11 so that the shoulder bars 13 can be moved to point more forward. Rotation of the head rail 11 is independent of rotation of the lift rail 3 (see FIG. 9A and FIG. 11). The torsion springs 20 are pre-loaded to provide rotational biases rearward, which apply a certain pre-loaded force to the head rails 11 to assist in encouraging the animals to move to the rear of the stalls 1 while the lift rail 3 is rotated. However, once the larger animals are as far rearward as desired, further rotation of the lift rail 3 causes the shoulder bars 13, which are attached to the pre-loaded head rails 11, to press harder against the larger animals. When the shoulder bars 13 initially contact the animals, the resistance imparted by pre-loaded biases of the torsion springs 20 is non-zero but the resilience of the torsion springs 20 allows the exit gates 10 to rotate forward so that continued rearward motions of the shoulder bars 13 do not harm the larger animals. Once the lift rail 3 has been rotated sufficiently for moving the smaller animals to the rear of the stalls 1, the lift rail 3 is returned to the neutral position. While the lift rail 3 is in the neutral position, if any of the animals is particularly unruly and wants to exit the stall 1, the animal encounters the shoulder bars 13 and experiences enough resistance due to the rotational biases of the torsion springs 20 to urge the animal back into position. However, if the animals still attempt to move forward, once the longitudinal axes B-B of the shoulder bars 13 are parallel to the longitudinal axes A-A of the mounting bars 8, the stop brackets 15 are abutting the lift rail 3 at a top portion 9 of the lift rail 3 (see FIG. 11) preventing the head rails 11, and therefore the exit gates 10, from further forward rotation. The stop brackets 15 comprise detents 19 at upper ends thereof that conform to the outer shape of the lift rail 3 to provide uniform abutment surfaces on the stop brackets 15 (see FIG. 8B). The exit gates 10 thereby prevent the animal from leaving the stalls 1. Overall, the head rails 11 can rotate through an angle of about 14.0° between the fully rearward position of the shoulder bars 13 (FIG. 8A and FIG. 10) and the fully forward position of the shoulder bars 13 (FIG. 9A and FIG. 11). In the fully forward position, the longitudinal axes B-B of the shoulder bars 13 are parallel to the longitudinal axes A-A of the mounting bars 8. Thus, the use of the torsion springs 20 as described above adds a safety factor in various ways, especially for larger animals.

While different torsion springs are useable together with the head rails 11, the torsion springs 20 are preferably elastomer powered torsional springs. As illustrated in FIG. 8C, an elastomer powered torsion spring comprises a tensioner housing 21 having a polygonal cross-section, preferably a square cross-section, that houses an insert 22 having the same or similar cross-section, preferably a square cross-section. The tensioner housing 21 and the insert 22 are tubes of different diameter, whereby the insert 22 is nested inside the tensioner housing 21, the insert 22 having an outside diameter sufficiently smaller than an inside diameter of the tensioner housing 21 that the insert 22 is capable of rotating inside the tensioner housing 21. The insert 22 is angularly rotated within the tensioner housing 21 with respect to the tensioner housing 21 to provide spaces 23 between internal corners of the tensioner housing 21 and outer faces of the insert 22. When the tensioner housing 21 and the insert 22 have square cross-sections, the insert 22 is angularly rotated by 45° within the tensioner housing 21 with respect to the tensioner housing 21. The spaces 23 are friction fitted with elastomeric plugs 24, which are sufficiently compressible and resilient to permit some rotation of the insert 22 in the tensioner housing 21 while providing a counter-bias against the rotation, thereby acting as a torsion spring. The elastomeric plugs 24 act as 'lever arms' in the torsion springs 20. The insert 22 has a hollow interior. Ends of the head rail 11 have a cross-sectional shape complementary to the cross-sectional shape of the hollow interior. The end of the head rail 11 is inserted into the hollow interior of the insert 22 so that the head rail 11 is engaged with inner walls of the insert 22. Forces acting on the head rail 11 by movement of an animal against the shoulder bars 13 are thereby transmitted to the insert 22 and then to the elastomeric plugs 24, the elastomeric plugs 24 providing the spring action for the torsion spring 20 to provide a counter-bias to the forces acting on the head rail 11. The tensioner housing 21 is contained in one of the outer housings 17 attached to one of the head-rail mounting brackets 16 to mount the torsion spring 20 on the lift rail 3.

The illustrated torsion spring 20 has an angular range of motion that permits rotation of the insert 22 through a maximum angle of about 16°. As previously indicated, the head rails 11 can rotate through an angle of about 14.0° between the fully rearward position of the shoulder bars 13. As seen in FIG. 8C, in order to provide the pre-loaded bias (i.e., a pre-loaded tension) of the torsion spring 20, the torsion spring 20 is pre-loaded at an angle a-a of about 2.0° with respect to vertical when the lift rail 3 is in the neutral position, the pre-load arising from the shoulder bars 13 pressing against the lift rail 3 at point 29 when the lift rail 3 is in the neutral position (see FIG. 8B). Elastomer powered torsional springs are particularly beneficial by providing a simple way of mounting the head rail while providing a rotational bias to the head rail through a limited angular range. Such torsion springs are available commercially, for example ROSTA™ Rubber Suspension Units.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A milking stall comprising:
   a lift rail;
   an actuator for rotating the lift rail between a neutral position and a maximum position, the actuator comprising an inflatable/deflatable air cushion;
   at least one divider mounted on and extending transversely rearward of the lift rail; and,
   at least one exit gate mounted on and depending downwardly from the lift rail, the at least one exit gate comprising a head rail rotatably mounted on the lift rail and at least one shoulder bar connected to and depending downwardly from the head rail,
   the at least one exit gate pivoting with the lift rail between the neutral position and the maximum position, the at least one shoulder bar pointing more rearward in the maximum position than in the neutral position, the head rail rotatably mounted on the lift rail through at least one torsion spring mounted on the lift rail, the at least one torsion spring biasing rotation of the head rail independent of and relative to the lift rail, the torsion spring pre-loaded on the lift rail to provide a rotational bias to the head rail so that the at least one shoulder bar is urged rearward by the rotational bias.

2. The milking stall of claim 1, wherein the torsion spring is pre-loaded on the lift rail so that the head rail is rotated at an angle of about 2.0° with respect to vertical when the lift rail is in the neutral position.

3. The milking stall of claim 1, wherein the at least one exit gate further comprises at least one stop bracket connecting the at least one shoulder bar to the head rail, the at least one stop bracket abutting the lift rail when the at least one exit gate is in a fully forward position thereby preventing the at least one exit gate from further forward rotation.

4. A milking parlor comprising the milking stall as defined in claim 1 and a lift system connected to the lift rail and configured to raise and lower the milking stall.

5. The milking parlor of claim 4, comprising a plurality of the milking stalls commonly sharing the lift rail and having a plurality of exit gates and dividers, the milking stalls situated side-by-side longitudinally along the lift rail, the stalls separated by the dividers.

6. A milking stall comprising:
a lift rail;
a support column attached to the lift rail, the support column configured to be pivotally connected to a lift system for raising and lowering the milking stalls;
an actuator for rotating the lift rail between a neutral position and a maximum position, wherein the actuator comprising an inflatable/deflatable air cushion mounted on the support column and situated to abut the lift system when the milking stall is mounted on the lift system;
at least one divider mounted on and extending transversely rearward of the lift rail; and,
at least one exit gate mounted on and depending downwardly from the lift rail, the at least one exit gate comprising a head rail rotatably mounted on the lift rail and at least one shoulder bar connected to and depending downwardly from the head rail,
the at least one exit gate pivoting with the lift rail between the neutral position and
the maximum position, the at least one shoulder bar pointing more rearward in the maximum position than in the neutral position,
the head rail rotatably mounted on the lift rail through at least one torsion spring mounted on the lift rail, the at least one torsion spring biasing rotation of the head rail independent of and relative to the lift rail, the torsion spring pre-loaded on the lift rail to provide a rotational bias to the head rail so that the at least one shoulder bar is urged rearward by the rotational bias.

7. The milking stall of claim 6, wherein the torsion spring is pre-loaded on the lift rail so that the head rail is rotated at an angle of about 2.0° with respect to vertical when the lift rail is in the neutral position.

8. The milking stall of claim 6, wherein the at least one exit gate further comprises at least one stop bracket connecting the at least one shoulder bar to the head rail, the at least one stop bracket abutting the lift rail when the at least one exit gate is in a fully forward position thereby preventing the at least one exit gate from further forward rotation.

9. A milking parlor comprising the milking stall as defined in claim 6 and a lift system connected to the lift rail and configured to raise and lower the milking stall.

10. The milking parlor of claim 9, comprising a plurality of the milking stalls commonly sharing the lift rail and having a plurality of exit gates and dividers, the milking stalls situated side-by-side longitudinally along the lift rail, the stalls separated by the dividers.

11. A milking stall comprising:
a lift rail;
an actuator for rotating the lift rail between a neutral position and a maximum position;
at least one divider mounted on and extending transversely rearward of the lift rail; and,
at least one exit gate mounted on and depending downwardly from the lift rail, the at least one exit gate comprising a head rail rotatably mounted on the lift rail and at least one shoulder bar connected to and depending downwardly from the head rail,
the at least one exit gate pivoting with the lift rail between the neutral position and the maximum position, the at least one shoulder bar pointing more rearward in the maximum position than in the neutral position,
the head rail rotatably mounted on the lift rail through at least one torsion spring mounted on the lift rail, the at least one torsion spring biasing rotation of the head rail independent of and relative to the lift rail, the torsion spring pre-loaded on the lift rail to provide a rotational bias to the head rail so that the at least one shoulder bar is urged rearward by the rotational bias;
wherein the torsion spring is an elastomer powered torsion spring comprising: a tensioner housing; an insert; and a plurality of elastomeric plugs, wherein
the tensioner housing has the insert inserted therein,
the tensioner housing and the insert have a same polygonal cross-sectional shape,
the insert is rotated with respect to the tensioner housing to provide spaces between internal corners of the tensioner housing and outer faces of the insert, and
the elastomeric plugs are friction fitted into the spaces.

12. The milking stall of claim 11, wherein the cross-sectional shape is a square.

13. The milking stall of claim 11, wherein the torsion spring is pre-loaded on the lift rail so that the head rail is rotated at an angle of about 2.0° with respect to vertical when the lift rail is in the neutral position.

14. The milking stall of claim 11, wherein the at least one exit gate further comprises at least one stop bracket connecting the at least one shoulder bar to the head rail, the at least one stop bracket abutting the lift rail when the at least one exit gate is in a fully forward position thereby preventing the at least one exit gate from further forward rotation.

15. The milking stall of claim 11, wherein the actuator comprises an inflatable/deflatable air cushion.

16. The milking stall of claim 11, further comprising a support column attached to the lift rail, the support column configured to be pivotally connected to a lift system for raising and lowering the milking stalls.

17. The milking stall of claim 16, wherein the actuator comprises an inflatable/deflatable air cushion mounted on the support column and situated to abut the lift system when the milking stall is mounted on the lift system.

18. A milking parlor comprising the milking stall as defined in claim 11 and a lift system connected to the lift rail and configured to raise and lower the milking stall.

19. The milking parlor of claim 18, comprising a plurality of the milking stalls commonly sharing the lift rail and having a plurality of exit gates and dividers, the milking stalls situated side-by-side longitudinally along the lift rail, the stalls separated by the dividers.

* * * * *